United States Patent [19]

Munneke et al.

[11] Patent Number: 5,556,086
[45] Date of Patent: Sep. 17, 1996

[54] METHOD FOR ASSEMBLING A POSTAL ITEM AS WELL AS A SYSTEM AND AN ALIGNING STATION FOR CARRYING OUT THIS METHOD

[75] Inventors: Christiaan A. Munneke, Surhuisterveen; Jeichienus A. van der Werff, Montfoort, both of Netherlands

[73] Assignee: Hadewe B.V., Drachten, Netherlands

[21] Appl. No.: 19,431

[22] Filed: Feb. 18, 1993

[30] Foreign Application Priority Data

Feb. 18, 1992 [NL] Netherlands .......................... 9200294

[51] Int. Cl.$^6$ ................................ B42C 1/00; B65H 7/02
[52] U.S. Cl. .................... 270/46; 270/58.02; 270/58.27; 53/117; 53/429; 53/504; 53/284.3; 493/23; 493/419; 271/227; 271/242; 271/199
[58] Field of Search .................... 270/45, 46, 51, 270/58, 59, 60; 53/504, 500, 493, 429, 117, 569, 284.3, 206; 493/23, 419, 421; 271/227, 242, 176, 213, 199; 414/788.9, 789, 790.3, 790.7

[56] References Cited

U.S. PATENT DOCUMENTS

| | | | |
|---|---|---|---|
| 2,516,454 | 7/1950 | Doran ..................... | 493/23 X |
| 3,260,517 | 7/1966 | Sather . | |
| 3,536,318 | 10/1970 | Gay et al. ................ | 270/58 |
| 3,785,256 | 1/1974 | Nikkel ..................... | 414/789 |
| 3,899,165 | 8/1975 | Abram et al. ............ | 270/58 X |
| 4,077,181 | 3/1978 | Asher et al. . | |
| 4,170,346 | 10/1979 | Murray et al. ............ | 270/54 |
| 4,462,587 | 7/1984 | Graef et al. . | |
| 4,527,468 | 7/1985 | Piotroski ................. | 270/58 X |
| 4,527,791 | 7/1985 | Piotroski ................. | 270/58 |
| 4,539,794 | 9/1985 | Azzaroni ................. | 53/493 |
| 4,765,502 | 8/1988 | Pintsov et al. . | |
| 4,799,663 | 1/1989 | Golicz ..................... | 271/213 X |
| 4,939,888 | 7/1990 | Katz et al. ................ | 54/411 |
| 4,962,623 | 10/1990 | Francisco ................ | 53/54 |
| 4,972,655 | 11/1990 | Ogawa ..................... | 53/495 X |
| 5,045,039 | 9/1991 | Bay ......................... | 493/23 X |
| 5,090,671 | 2/1992 | Gombault et al. ........ | 270/45 |
| 5,244,196 | 9/1993 | Walter et al. ............ | 270/59 X |
| 5,246,219 | 9/1993 | Watkiss ................... | 270/58 |
| 5,289,251 | 2/1994 | Mandel et al. ........... | 270/59 X |
| 5,342,038 | 8/1994 | Suter ....................... | 414/790.7 X |

FOREIGN PATENT DOCUMENTS

| | | |
|---|---|---|
| 228182 | 7/1987 | European Pat. Off. . |
| 0237129 | 9/1987 | European Pat. Off. . |
| 0421547A1 | 4/1991 | European Pat. Off. . |
| 447581 | 9/1991 | European Pat. Off. . |
| 0448732 | 10/1991 | European Pat. Off. . |
| 2513607 | 4/1983 | France . |
| 2641499 | 7/1990 | France . |
| 2940771 | 4/1981 | Germany . |
| 92172 | 4/1989 | Japan ............................ 270/58 |
| 369113 | 6/1963 | Switzerland .................. 270/58 |
| WO91/04215 | 4/1991 | WIPO . |

Primary Examiner—Edward K. Look
Assistant Examiner—John Ryznic
Attorney, Agent, or Firm—Burns, Doane, Swecker & Mathis, L.L.P.

[57] ABSTRACT

Postal items are assembled using a system with delivery stations and a folding station. Documents are delivered by the delivery stations. The documents are gathered into a stack having on one side substantially aligned document edges. The stack is supplied to the folding station in a direction transverse to these edges. According to the invention the documents, after being delivered, are displaced relative to each other in an area downstream of the delivery stations and upstream of the folding station until these document edges are substantially aligned on one side of the documents. By virtue of the invention, it is possible, inter alia, to use delivery stations and transport means of simple construction. There is also proposed a system with an aligning station for carrying out the method according to the invention.

42 Claims, 2 Drawing Sheets

FIG. 2

METHOD FOR ASSEMBLING A POSTAL ITEM AS WELL AS A SYSTEM AND AN ALIGNING STATION FOR CARRYING OUT THIS METHOD

BACKGROUND OF THE INVENTION

This invention relates to a method for assembling a postal item using a system comprising a first delivery station, at least one next delivery station and a folding station, in which documents are delivered by these delivery stations, which documents are transported and are gathered into a stack having on one side substantially aligned document edges, which stack is supplied to the folding station in a direction transverse to these edges.

As used herein, a "delivery station" is any station capable of delivering documents intended for a postal item to be mailed, e.g. a printer, a burster, a feeder station or a cross folding machine for longitudinally folding a document.

A method as described above is known from U.S. Pat. No. 3,260,517.

In this known method a main document is carried by transport means along a plurality of delivery stations, one or more of which delivery stations can deliver at least one secondary document. The secondary document is added to the main document when it passes the relevant delivery station. A secondary document may be, e.g., a general enclosure or a unique document belonging to the given main document.

It is a drawback of these known methods that a document to be added to the main document is to be delivered in such a manner that one of its edges is positioned in closely aligned condition—i.e. located in the same plane in the direction of the stack—relative to the corresponding edge of the main document. This demands a lot of the transport means and the delivery stations. Moreover, it must be ensured that during transport and when adding further secondary documents the resulting alignment is not lost.

In order to obtain an acceptable result when folding and to ensure that the folded stack of documents fits into the corresponding envelope, in practice, when supplying the stack to the folding station, a misalignment between the aligned edges of two stacked documents of not more than 5 mm is acceptable and of less than 2 mm is desirable.

Delivery stations which meet the above requirements are relatively expensive and complicated and also cover a relatively large space. In particular owing to its great length a system comprising such delivery stations constitutes an obstacle in a workroom in which it can hardly be accommodated.

For assembling very large amounts of postal items it is known to fold each document to be folded individually prior to delivering it, owing to which the accuracy with which the enclosure documents are added only needs to meet relatively low requirements. If required, these documents may shift in the envelope relative to each other. Such a method is described in German patent application 29 40 771.

It is a drawback of this method that machines adapted to deliver folded documents from a plurality of delivery stations are expensive because for each delivery station for delivering documents to be folded a corresponding folding station is required. It is a further drawback of this known method that folded documents are hard to control when being delivered and transported further because they tend to fold open again in various measure.

SUMMARY OF THE INVENTION

It is an object of the invention to provide a method for assembling a folded postal item, which method can be carried out with delivery stations that are relatively simple and, therefore, can be produced at low cost.

The secondary documents destined for a given postal item can be delivered without closely determining the time of supply depending on the passage of the main document.

The delivery stations can be of compact and simple design because they need not meet the requirements as to the accuracy of the position and the time at which a secondary document can be delivered and because during transport of the documents delivered, before aligning these documents, the control of the documents only needs to satisfy relatively low requirements.

Since the delivery of documents and their transport to the aligning station must satisfy relatively low requirements, this may occur at high speed without interruption of the transport of documents already delivered and at high frequencies. Moreover, the distances between the delivery stations may be small so that the documents need to be transported over a short distance only.

When a plurality of documents are delivered by a delivery station, this leads to relatively little delay due to the high delivery frequency. Moreover, if documents destined for a given stack are to be delivered by a plurality of stations, the delivery of a series of documents by a given delivery station may be interrupted by delivering one or more documents by one or more delivery stations so as to obtain an optimum stream of documents in the transport means.

At a given production rate the number of simultaneously transported documents is therefore relatively small. This simplifies the control of the system and the continuation of the method, e.g. after a document jam ("job recovery").

The invention can further be embodied by a system for assembling a postal item, comprising a first and at least one next delivery station for delivering documents, transport means for transporting delivered documents, means for gathering documents belonging to a given set into a stack having on one side substantially aligned document edges, a folding station for folding this stack of documents, an aligning station arranged downstream of the delivery stations and upstream of the folding station, for displacing the documents of a set relative to each other until the document edges located on one side of the stack are substantially aligned, for carrying out the method according to the invention, or by an aligning station intended for use in this system, comprising a supply track for documents delivered from a plurality of delivery stations, a gathering position and a discharge track for discharging documents gathered into a stack.

DETAILED DESCRIPTION OF EMBODIMENTS OF THE INVENTION

Figure 1:
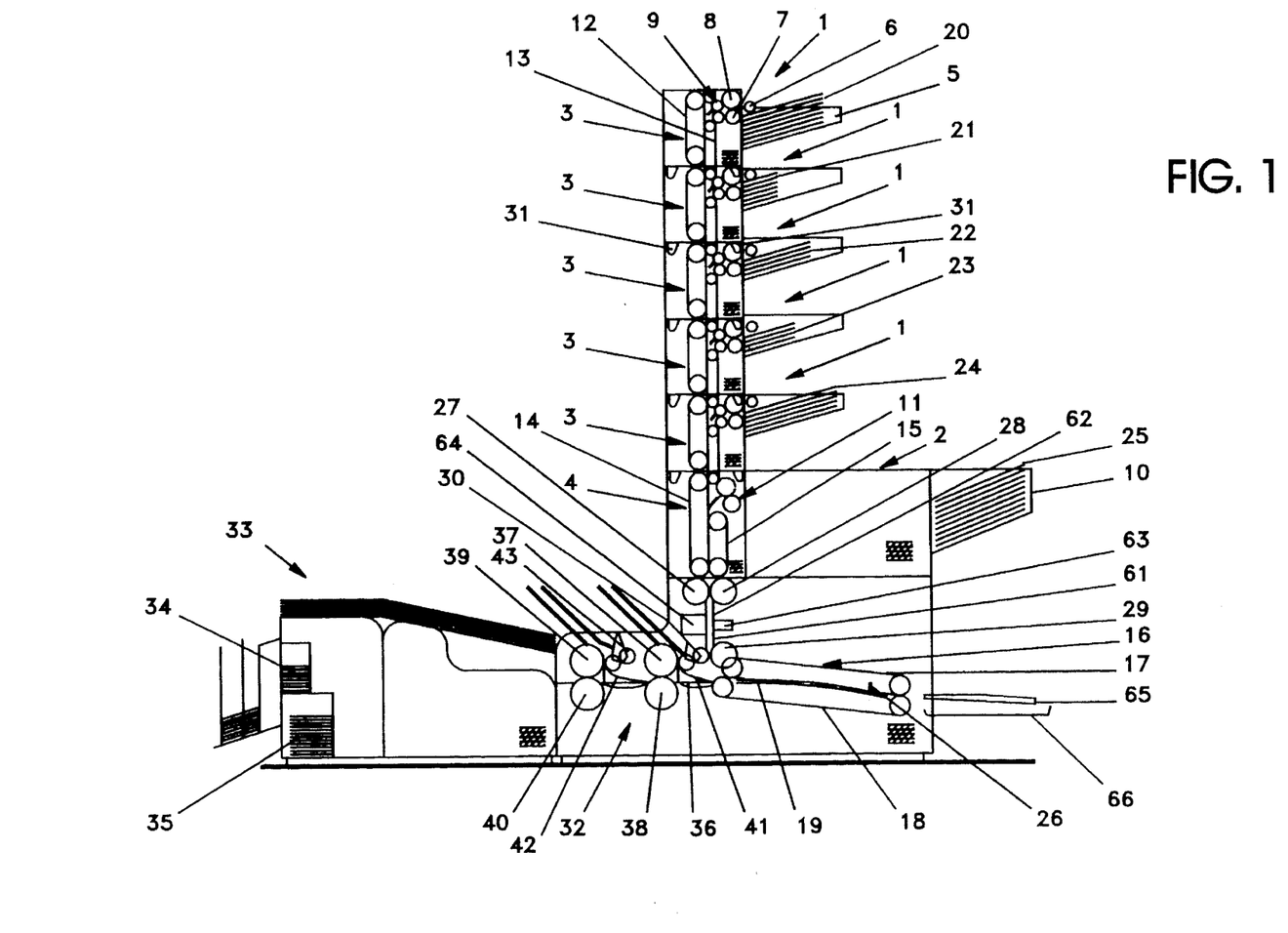
FIG. 1 shows a cut-away side elevational view of a postal assembling system according to one exemplary embodiment of the invention.

The invention will first be elucidated by means of the exemplary embodiment, shown in FIG. 1 and preferred most, of a system according to the invention for assembling a postal item.

The system is equipped with a plurality of delivery stations 1, 2 for delivering documents 20–25.

The first four delivery stations are designed as feeder stations 1. Each of the feeder stations 1 is provided with a container 5, a supply roller 6, a separating roller 7, a transport roller 8 and a pair of delivery rollers 9. An example of a separating device suitable for use in a feeder according to the exemplary embodiment shown is described in more detail in commonly assigned U.S. patent application Ser. No. 917,055, to which reference is being made here.

The last delivery station is designed as a printer 2 with a container 10 for the sheets to be printed and a pair of delivery rollers 11 for delivering a printed sheet at a suitable moment. Preferably, the printer 2 is of such design that the printing of a sheet is completed before the sheet reaches a waiting position between the delivery rollers 11.

The delivery stations 1, 2 are combined with transport means 3, 4 to form delivery/transport units connectible to each other. The transport means 3 connected with the feeder stations 1 comprise conveyor belts 12, 13 which are staggered relative to each other and are partly positioned opposite each other. Of these conveyor belts, the conveyor belt 13 located downstream of a transport unit located upstream extends to opposite a conveyor belt 12 or 14 located upstream of a next transport unit 3 or 4 located downstream. Consequently, a document can be passed on to a next transport unit 3 or 4. The last transport unit 4 comprises conveyor belts 14, 15 located opposite each other and ending directly opposite each other.

The delivery/transport units equipped with a feeder station 1 are provided with legs 31 which, in mounted condition, project into a subjacent station. The legs 31 ensure that the conveyor belt 13 located downstream remains clear of the ground when a demounted delivery/transport unit is put down on it.

Since the delivery stations 1 and 2 are arranged in a row extending in vertical direction above the aligning station 16, the system according to the exemplary embodiment shown takes up very little space. Moreover, the containers 5 of the delivery stations 1 and 2 are easily and simultaneously accessible for a person operating the system.

The system further comprises an aligning station 16 for aligning documents belonging to a given set to a stack having on one side substantially aligned document edges.

The aligning station 16 is designed as a head station having a supply track, an aligning surface with a displaceable stop 26 and a discharge track 36 in alignment with the aligning surface 19. The supply track is formed by transport rollers 27, 28, 29, 30 and guides 61, 62, and the aligning surface is formed by a portion of a conveyor belt 18 passing over a support 19. Documents supplied by the transport unit 4 can be carried along this supply track to the aligning surface 19.

The documents can be transported in the direction of supply to opposite the stop 26 and then be discharged in the opposite direction. The aligned document edges then form the trailing edge of the stack, which is advantageous when folding the stack. In the station 32 the place of each fold is determined relative to the trailing edge of the stack of documents.

The stop 26 is attached to the conveyor belt 18. The stop can be displaced by running the conveyor belt 18.

Arranged opposite the aligning surface 19 are pressing means 17 which are displaceable in the direction of the stop 26 approximately parallel to the aligning surface 19, can apply some pressure to the aligning surface 19 and have a greater coefficient of friction than does the aligning surface. By displacing the pressing means in the direction of the stop 26 documents present between the aligning surface and the pressing means can be pressed against the stop so that the document edges on the side of the stop 26 are aligned relative to each other.

The aligning surface 19 is convexly curved in the direction of movement of the stop 26. The pressing means are designed as an endless belt 17 subjected to a given tension, one end of which belt extends along the aligning surface 19. As a result of the tension of the endless belt 17 of the pressing means this belt applies an evenly distributed pressure in the direction of the aligning surface 19 in an area contiguous to the stop 26.

The conveyor belt 17 has a greater coefficient of friction relative to the material of the documents than does the conveyor belt 18. By driving the conveyor belt 17 for applying a pressure to a document located between the belts 17 and 18 in the direction of the stop 26 this document will move over the belt 18 against the stop 26. A next document partly carried between the preceding document and the conveyor belt 17 will also move over the preceding document against the stop 26 when the belt 17 is driven in the direction of the stop 26. Successive documents can thus be aligned.

In the system according to the exemplary embodiment shown the stop 26 can be removed from the aligning surface by running the belt 18 until the stop 26 passes one of the end rollers thereof. Opposite the discharge track 36 and in alignment with the aligning surface, a second supply track 65 is connected to the aligning surface. When the stop 26 of the aligning surface 19 has been removed, documents can be supplied from this second supply track. After these documents have arrived on the aligning surface, the stop can be returned to the aligning surface so as to align these and any further documents.

It is an advantage of such a second supply track 65 that a further delivery station can be connected thereto, whereby documents arrived from that delivery station need not be carried along the other transport units. Arranging the second supply track in aligment with the aligning surface 19 has the special advantage that this enables inflexible articles, such as credit cards, to be supplied to the aligning surface.

Instead of a second supply track, a removal station 66 may connect to the aligning surface opposite the discharge track 36. When the stop 26 is moved away from the aligning surface 19, documents located on the aligning surface can be carried to that removal station, instead of to the discharge track 36.

The system further comprises a folding station 32 for folding documents coming from the aligning station 16, which documents can be aligned to stacks with the document edges aligning against the stop 26. In the discharge direction of the stop 26, there are provided a first and a second pair of folding rollers 37, 38 and 39, 40, with the discharge track 36 extending between the folding rollers 37, 38 and 39, 40. Between the stop 26 and the folding rollers 37, 38 and 39, 40, means 41 and 42 are arranged for deflecting the edge of a stack that faces away from the stop 26. Opposite one of the folding rollers, means 30, 43 are located for pressing a deflected portion of a stack against a jacket surface of the folding roller 37 and 39, respectively.

After alignment of the documents the stack is first displaced counter to the direction of supply and then moved to the folding station 32 by shifting the stop 26. Thus, the edge of the stack remote from the stop 26 and a contiguous portion of the stack are deflected along a pair of folding rollers 37, 38 or 39, 40 and are clamped against the proximal folding roller 37 or 39 of this pair of folding rollers 37, 38 or 39, 40, whereafter the folding rollers are driven so that the deflected portion of the stack is bent further and is brought between the folding rollers, where a fold is provided in the stack.

Thus, the position of each fold can advantageously be determined by means of the position of the edge of the stack on the side of the stop 26. By operating the pressing roller 30, depending on the position of the stop 26, the position of the folds can be determined easily and accurately.

When supplying documents to the folding station 32, the conveyor belt 18 and preferably also the conveyor belt 17 are driven so that their portions facing each other move in the direction of the folding station 32. The documents between the conveyor belts are then forced by the stop 26 toward the folding station 32. Of course, a single document may also be brought between the conveyor belts 17 and 18 and then be supplied to the folding station 32.

A folding station and a folding method of the type as described above is described in more detail in commonly assigned U.S. Pat. No. 5,090,671, to which reference is being made here.

An envelope station 33 connects to the folding station 32. This envelope station 33 is equipped with two containers 34, 35 for envelopes. As a base for such an envelope station 33, the "in2" can be used, as produced and marketed by applicants. A method for selecting, depending on the documents to be packaged, an envelope container for delivering an envelope is described in commonly assigned U.S. patent application Ser. No. 831,527, to which reference is being made here.

According to the invention the aligning station is located downstream of the delivery stations 1, 2 and upstream of the folding station 32.

When assembling a postal item using a system according to the exemplary embodiment shown, documents are delivered by the delivery stations 1, 2 to the transport units 3, 4. The documents are aligned by the aligning station 16 to form a stack having on one side substantially aligned document edges. This stack is supplied to the folding station 32 in a direction transverse to the above edges.

In essence, the documents, after being delivered, are displaced relative to each other in an area downstream of the delivery stations 1, 2 and upstream of the folding station 32, until the document edges are substantially aligned on one side of the documents.

This has the advantage that the delivery stations 1, 2 and the transport means 3, 4 can be of compact and simple design because they need not meet requirements as to the accuracy of the position and the time at which a document 20–25 can be delivered and because during transport of the delivered documents, before aligning them, the control of the documents needs to satisfy only relatively low requirements.

Because the delivery and the transport of documents are to meet relatively low requirements, this may occur at high speed, without interruption of the transport of documents already delivered.

At least a plurality of documents to be gathered into a set can be delivered at such times that, before being moved relative to each other downstream of the delivery stations 1, 2 and upstream of the folding station 32, this plurality of documents can be transported in a configuration in which these documents overlap each other and each next one of these documents projects relative to the preceding document in the same direction, transverse to the edges to be aligned.

A number of the documents of a set, or optionally a complete set of documents, are then gathered and transported in gathered condition already during delivery. This enables a large number of documents to be transported simultaneously, which, in turn, has the advantage that a large number of documents can be processed per time unit.

Each next document of a number of overlapping documents is staggered relative to a preceding document in the same direction. Thus, corresponding edges of these documents can simply be aligned.

Preferably, the documents are delivered in such a way that during alignment a document smaller in a direction transverse to the document edges to be aligned moves over a greater distance than does a document larger in this direction. It is thus avoided that when displacing a large document the edge of which is not yet aligned, and which is not entrained by that larger document, remains in place or at least is not completely aligned.

As described before, the aligning station 16 can also gather a number of documents of a set or a complete set. These documents are thus both aligned and gathered downstream of the delivery stations 1, 2 and upstream of the folding station 32.

When gathering downstream of the delivery stations 1, 2, the documents can be supplied in any order, and during transport any of the documents can be individually scanned by the same scanning device.

Moreover, when gathering in combination with aligning, the documents are gathered at a fixed place so that this is relatively easy to control.

For scanning documents delivered, scanning means for scanning a passing document to be gathered are provided downstream of the delivery stations 1, 2 and upstream of the folding station 32. According to the exemplary embodiment shown, the scanning means are designed as a light source 63 and a photosensitive cell 64. This enables, e.g., the measurement of the length of a passing document by also scanning the rotation of one of the transport rollers 27–30.

The above means 27–30, 63 and 64 for measuring the length of a passing document to be gathered can be connected with a data processor for inputting and storing a signal corresponding with the measured length in this data processor. This signal may, in turn, be used, e.g., as input data for adjusting the folding station 32 so as to determine the number of folds as well as the place and the direction of folding in such a way that the documents fit into a given envelope with some play.

The scanning means may also comprise a scanner for scanning characters present on the documents, which scanner is connected with a data processor. These characters may consist of, e.g., coded processing instructions on a main document. The data processor may control, by means of the scanned characters, the other stations of the system so as to, e.g., activate the correct delivery stations 1, 2 for adding the correct documents, adjusting the folding station 32 and selecting the correct envelope container 34, 35 for the delivery of an envelope.

The scanning means may further comprise a thickness meter for measuring the thickness of a passing document to be gathered, which thickness meter is connected with a data processor for inputting a signal corresponding with the measured thickness to this data processor. The signal corresponding with the measured thickness can be compared with a reference signal so as to check whether one document has been delivered and is transported or an error has occurred and several or just no document has been delivered and is transported. When documents have mutually different thicknesses, there can also be checked whether the correct document has been delivered and is transported.

The aligning station 16 is designed as a unit to be incorporated in a postal assembling system. Delivery stations, envelope stations and the like may be connected to this aligning station to obtain a system configuration which meets the user's requirements and can moreover be varied.

According to the present exemplary embodiment the aligning station is combined with the folding station 32 to form an aligning/folding unit by arranging a first and a second pair of folding rollers 37, 38; 39, 40 on opposite sides of the discharge track of the aligning station.

Preferably, selected documents are individually transported and gathered downstream of the delivery stations 1, 2 and upstream of the folding station 32, and other documents are gathered during delivery. Consequently, only those documents which are to be scanned are individually transported, and time can be saved by transporting the other documents in gathered condition so that despite individual transport of documents to be scanned a relatively high processing rate can be achieved notwithstanding.

Before starting a run, a plurality of documents are delivered, each document delivered being individually transported and scanned downstream of the delivery stations. Data concerning these documents obtained during scanning, such as length and identification, can be stored. These data may then be used for controlling the system, e.g. for controlling selected delivery stations for delivering one or more documents present therein or for adjusting the folding station 32.

More in particular, it can be determined, e.g., which enclosure documents are present in which delivery stations. When assembling the postal items, these delivery stations may then be controlled depending on characters on the main documents, which characters indicate which enclosure documents are to be added. Accordingly, the system itself determines which delivery stations are to be controlled so as to add the correct enclosure documents to a main document. Neither the operator of the system nor the person responsible for determining which enclosure document is to be added to which main document needs to occupy himself with this.

In order to check by way of test whether the correct enclosure documents are supplied, selected delivered secondary documents can be individually transported at given intervals and scanned downstream of the delivery stations. Thus, it can be determined, e.g., whether during reloading of a delivery station the correct documents are loaded.

When it has been predetermined which documents are to be delivered by which delivery station, the scanning of the secondary documents can also be carried out when, during a run, a secondary document is delivered by a given delivery station for the first time, individually transporting this document and scanning it downstream of the delivery stations. This has the advantage that the step of scanning the documents when starting up can be omitted, which saves time. Because no documents are delivered only for scanning, paper waste is avoided without it being necessary to clear documents delivered only for scanning.

Furthermore, main documents can be individually transported and scanned downstream of the delivery stations so that characters of the main documents can be scanned. The information obtained during the scanning of the characters can be used for controlling the system.

In order to determine which document is present in a delivery station, characters of a passing secondary document can be scanned during scanning and a document code corresponding with the scanning result can be stored in a data processor in association with a delivery station code associated with the delivery station by which the scanned document has been delivered.

According to an alternative embodiment of the invention, the length and thickness of a document are scanned, and a document code corresponding with the scanning result is stored in a data processor in association with a delivery station code associated with the delivery station by which the scanned document has been delivered. When a next document is delivered by this delivery station, it can be determined by means of the length and thickness scanned therefrom whether this document corresponds with the first document delivered by this delivery station.

When during the scanning of a passing document its length is measured, the result of this measurement may further be stored in a memory of a data processor as a code representing the length of this document. This code may then be used, e.g., to adjust the folding station 32, e.g. as regards the number of folds to be provided and the distances from this fold or these folds to one of the edges of the stack of documents to be folded. This length code may also be used to select one of the envelope hoppers 34, 35 for delivering an associated envelope.

The above code representing a length, associated with a document supplied to the aligning position, may also be used to determine the distance over which this document is displaced, substantially counter to the direction of supply, until the trailing edge thereof has been brought outside the supply track. By bringing the trailing edge of a document supplied to the aligning station 16 outside the supply task, it is avoided that a next supplied document to be added to the above document strikes the edge of the above document remote from the stop 26.

The displacement substantially counter to the direction of supply can be obtained according to the exemplary embodiment shown in FIG. 1 by displacing the stop 26 along the aligning surface 19 in the direction of the folding station 32. The former trailing portion of the supplied documents will then be displaced below the guide 61, whereby this is not returned in the direction of the delivery stations 1 and 2, but is displaced outside the portion of the transport track coming from these stations 1 and 2. A next document supplied along the guide 61 will connect to the document that arrived last, at some distance from the trailing edge of this document, and will thus not strike the previous trailing edge of this document.

After each displacement of a document against the stop 26 this stop 26 can be displaced in the direction of supply, i.e. away from the folding station 32, until adjacent the end of the aligning station 19 remote from the folding station 32. This ensured that the trailing portion of each supplied document passes the guide 61. Accordingly, it is avoided that during a subsequent displacement of the stop 26, counter to the direction of supply, a document is returned in the direction of the delivery stations 1 and 2.

Depending on the above code representing a length, associated with a document, this document can be displaced in the direction of supply, until its trailing edge has left the supply means 61 located upstream. Consequently, the distance over which the document to be supplied as well as any documents already supplied to the aligning position are displaced in the direction of supply can be kept as short as possible. Moreover, the distance over which the documents supplied are displaced during the subsequent displacement counter to the direction of transport can also be kept as short as possible. This, in turn, has the advantage that the above displacements take little time and/or that the displacements can be carried out relatively slowly and therefore with relatively small accelerations.

When after a given document a considerably shorter document is supplied, it is not necessary, for that matter, to displace the stop 26 in the direction of supply so as to clear the trailing document completely from the transport means upstream of the aligning surface 19.

As already described above, the length and thickness of a passing document can be measured during scanning and the results of these measurements can be stored in a memory of a data processor as a code representing respectively the length and the thickness of this document. Depending on the stored codes each representing a length and a thickness of a document, associated with the documents which form a stack to be packaged, the envelope station 33 can supply an envelope of a given size, in which this stack is packaged. Also, depending on the codes each representing a length of a document, associated with the documents which form a stack to be packaged and a code representing the height of the envelope supplied, the folding station 32 is adjusted regarding the number of folds to be provided and the distances from these folds to one of the sides of the stack.

Thus there can be obtained an automatic selection of an envelope adapted to the volume of the stack to be packaged as well as an automatic adjustment of the folding station 32 considering the length of the documents to be packaged and the height of the envelope selected therefor.

The exemplary embodiment, shown in FIG. 2, of an aligning station 116 for use in a system according to the present invention will hereinbelow be elucidated in more detail.

The aligning station 116 comprises a supply track (diagrammatically shown by the dot-dash line) 44, an aligning surface 119 connecting to the supply track 44 and a discharge track 136. Arranged along the supply track 44 are a detector 45 for detecting a trailing edge 46a of a document 47a and, downstream of the detector 45, means 48 for the controlled transportation of the document 47a. The aligning station is further equipped with first and second, individually operable fixing means 49 and 50 for retaining a document resting on the aligning surface 119. The first fixing means 49 are located downstream of the point where the supply track 44 connects to the aligning surface 119, and the second fixing means 50 are located outside the supply track 44 on the side of the first fixing means 49 that faces the supply track 44.

Figure 2:
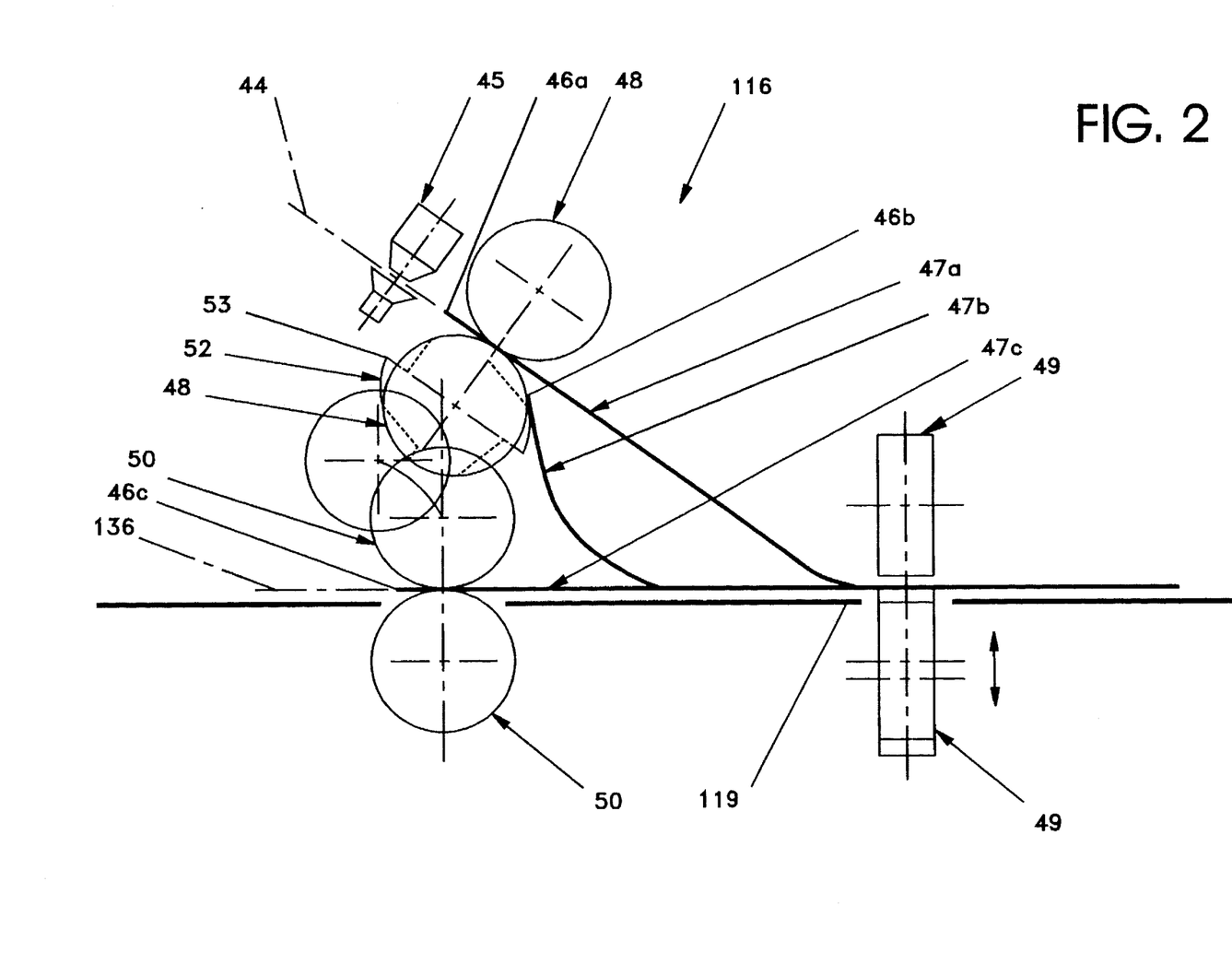
FIG. 2 shows a diagrammatic side elevational view of an aligning station arranged for use as part of a system according to the invention.

By using the aligning station 116 according to the exemplary embodiment shown in FIG. 2, documents supplied by means of supply means upstream of the aligning station can be gathered and aligned by stopping a document 47a supplied, with the trailing edge 46a in a given position, while the document is retained adjacent the trailing edge 46a. This retaining may be done by means of the means 48 for the controlled transportation of the document 47a.

Subsequently, the document 47a can be fixed between the first fixing means 49 at some distance from the trailing edge 46a approximately in the plane of the aligning surface 119.

Since the first fixing means 49 retain the document 47a and any further documents already present on the aligning surface 119, the second first fixing means 50 can be cleared without displacement of any documents already present on the aligning surface 119.

Subsequently, the trailing edge 46a and a contiguous portion of the document 47a are transported further and thereby bend towards the aligning surface 119. The document then passes from the position indicated by 47a via the position indicated by 47b to the position indicated by 47c. The rotation of the lower roller 51 of the transport means 48 causes the trailing edge to move downwards, from the position indicated by 46b, so that it can reach the position indicated by 46c.

Arranged between the lower rollers 51 of the transport means 48 is a hook wheel 52 coupled with the rollers 51 so as to rotate with these rollers. The hook wheel 52 is provided with teeth 53 having steep flanks that face the direction of transport. These hook wheels 52 ensure that the trailing edge 46b of paper which is in the position indicated by 47b does not keep slipping along the roller 51, but the paper 47b is deflected and the trailing edge 46b is bent towards the aligning surface. Interposed between the rollers opposite the rollers 51 is some free space opposite the hook wheel 52, so that paper between the rollers 51 can deflect to some extent. It is also possible, however, to make the teeth flexible or to provide the circumferential surface of the rollers 51 with a profile in the axial direction. Of course, there may also be used a plurality of hook wheels.

Subsequently, the document 47c can be fixed adjacent its trailing edge 46c by means of the second fixing means 50, and the fixation can be cleared by the first fixing means 49, at some distance from the trailing edge 46c, for receiving a next document while the documents already arrived on the aligning surface 119 are retained by the second fixing means 50.

Successive documents are all aligned with the trailing edges at the height of the former trailing edge indicated by 46c.

At the aligning station 116 shown in FIG. 2 the fixing means 49 and 50 are each designed as a pair of opposite transport rollers, located approximately on opposite sides of the aligning surface 119. This has the advantage that each of the fixing means 49 and 50 can also be used for discharging documents gathered on the aligning surface 119.

Although it is possible to design only one of the fixing means 49 and 50 as a pair of transport rollers arranged opposite each other, in the aligning station 116 shown in FIG. 2 both fixing means 49, 50 are designed as a pair of transport rollers arranged opposite each other approximately on opposite sides of the aligning surface. Moreover, the rollers of the first pair of fixing means 49 are rotatable for laterally discharging documents, and the rollers of the second pair of fixing means 50 are rotatable for longitudinally discharging documents. This enables documents gathered on the aligning surface 116 to be discharged in four directions. Stacks to be enveloped may be discharged, e.g., along the transport track 136, and other stacks may be collected, e.g., in three different receptacles. It is also possible to combine the aligning station shown in FIG. 2 with more than one envelope stations, e.g. for packaging stacks of documents in any order into different envelopes without it being necessary to procure a special envelope machine with more than one envelope hopper.

We claim:

1. A method for assembling a postal item using a system comprising a first delivery station, at least one next delivery station, a scanner, and a folding station, in which documents of mutually different lengths are delivered by said delivery stations, at least some of the documents are individually passed and scanned by a scanner at a location downstream of the delivery stations, said delivered and scanned documents are transported and are gathered into a stack and moved relative to each other until the document edges on one side of the documents are substantially in alignment, wherein the gathering and aligning of delivered documents, at least partly, occurs downstream of said delivery stations and upstream of said folding station, which stack is supplied to the folding station in a direction transverse to said aligned edges.

2. A method according to claim 1, wherein at least two of the documents to be gathered into a set are delivered, at such times that, before being moved relative to each other downstream of the delivery stations and upstream of the folding station, said at least two documents are transported in a configuration in which said documents overlap each other and each next one of said documents projects relative to the preceding document in the same direction, transverse to the edges to be aligned.

3. A method according to claim 1, wherein selected documents are individually transported and are gathered downstream of said delivery stations and upstream of said folding station and other documents when delivered are gathered into a configuration in which said other documents overlap each other and each next one of said document edges projects relative to the preceding document in the same direction transverse to the edges to be aligned, and are transported in said configuration before being moved relative to each other downstream of said delivery stations and upstream of said folding station.

4. A method according to claim 1, wherein prior to starting a run a plurality of documents are delivered and each delivered document is transported individually and scanned downstream of the delivery stations.

5. A method according to claim 1, wherein at a given interval selected delivered secondary documents are transported individually and are scanned downstream of the delivery stations.

6. A method according to claim 1, wherein when during a run a given delivery station delivers a secondary document for the first time, said document is transported individually and scanned downstream of the delivery stations.

7. A method according to claim 1, wherein delivered main documents are transported individually and are scanned downstream of the delivery stations, with characters of the main document being scanned.

8. A method according to claim 1, wherein during scanning characters of a passing secondary document are scanned and a document code corresponding with the scanning result is stored in a data processor in association with a delivery station code associated with the delivery station by which the scanned document has been delivered.

9. A method according to claim 4, wherein during scanning the length and the thickness of a document are scanned and a document code corresponding with the scanning result is stored in a data processor in association with a delivery station code associated with the delivery station by which the scanned document has been delivered.

10. A method according to claim 4, wherein during scanning the length of a passing document is measured and the result of said measurement is stored in a memory of a data processor as a code representing the length of said document.

11. A method according to claim 10, wherein depending on said code representing a length, associated with a document supplied to an aligning position, said document is displaced substantially counter to the direction of supply, in such a manner that its trailing edge is brought outside a supply track.

12. A method according to claim 11, wherein depending on said code representing a length, associated with a document, said document is displaced in the direction of supply, until its trailing edge has left the supply means located upstream.

13. A method according to claim 10, wherein the folding station as regards the number of folds to be provided and the distances from said folds to one of the edges of the stack, is adjusted depending on codes each representing a length of a document of the stack of documents to be folded.

14. A method according to claim 10, wherein the stack after alignment is displaced counter to the direction of transport by shifting a stop, whereby the edge of the stack remote from said stop and a contiguous portion of the stack are deflected along a pair of folding rollers and subsequently are clamped against a proximal folding roller of said pair of folding rollers, whereafter the folding rollers are driven so that the deflected portion of the stack is bent further and is brought between the folding rollers, where a fold is provided in the stack.

15. A method according to claim 4, wherein during scanning the thickness of a passing document is measured and the result of said measurement is stored in a memory of a data processor as a code representing the thickness of said document.

16. A method according to claim 4, wherein during scanning the length and the thickness of a passing document are measured and the results of said measurements are stored in a memory of a data processor as a code representing the length and a code representing the thickness of said document, and an envelope station, depending on the stored codes each representing a length and a thickness of a document, associated with the documents which form a stack to be packaged, supplies an envelope of a given size, in which said stack is packaged, and, depending on the codes each representing a length of a document, associated with the documents which form a stack and a code representing the height of the envelope supplied, the folding station is adjusted regarding the number of folds to be provided and the distances from said folds to one of the sides of the stack.

17. A method according to claim 2, wherein documents are gathered and aligned by stopping a document supplied with its trailing edge in a given position, while the document is retained adjacent said trailing edge, subsequently fixing said document at a first point spaced from the trailing edge approximately in the plane of an aligning surface, using first fixing means, clearing second fixing means for fixing a document on the supply side of the first fixing means, approximately in the plane of the aligning surface, transporting further the trailing edge and a contiguous portion of said document and bending same towards the aligning surface, fixing the document adjacent its trailing edge, using said second fixing means, and clearing said first fixing means spaced from the trailing edge.

18. A system for assembling a postal item, comprising:

a first and at least one next delivery station for delivering documents of mutually different lengths;

transport means for transporting delivered documents;

means for gathering documents belonging to a given set into a stack having on one side substantially aligned document edges;

an aligning station, arranged downstream of the delivery stations, for displacing the documents in a set relative to each other until the document edges located on one side of the stack are substantially aligned, the aligning station having a supply track, an aligning surface with a displaceable stop and a discharge track in alignment with the aligning surface;

a removal station located opposite the discharge track and connecting to the aligning surface, the stop being removable from the aligning surface; and, a folding station downstream of the aligning station for folding said stack of documents.

19. A system for assembling a postal item, comprising:

a first and at least one next delivery station for delivering documents;

transport means for transporting delivered documents;

a gathering and aligning station arranged downstream of the delivery stations for gathering documents belonging to a given set into a stack and for displacing the documents in a stack relative to each other until the document edges located on one side of the stack are substantially aligned;

a scanner located downstream of the delivery stations and upstream of the gathering and aligning station for scanning individually each passing document from any of the delivery stations; and, a folding station downstream of the gathering and aligning station for folding said stack of documents.

20. A system according to claim 19, wherein said scanning means comprise a scanner, connected to a data processor, for scanning characters present on the documents.

21. A system according to claim 19, wherein said scanning means are arranged for measuring the length of a passing document to be gathered, and are connected to a data processor for inputting a signal corresponding with the measured length to said data processor.

22. A system according to claim 19, wherein said scanning means comprise a thickness meter for measuring the thickness of a passing document to be gathered, which thickness meter is connected to a data processor for inputting a signal corresponding with the measured thickness to said data processor.

23. A system according to claim 19, wherein the delivery stations are arranged in at least one row extending in vertical direction above the aligning station.

24. A station according to claim 19, comprising a pair of folding rollers arranged opposite each other on opposite sides of the discharge track.

25. A method for assembling a postal item using a system comprising a first delivery station, at least one next delivery station and a folding station, in which documents are delivered by said delivery stations, which documents are transported and are gathered into a stack having on one side substantially aligned documents edges, wherein documents are gathered and aligned by stopping a document supplied with its trailing edge in a given position, while the document is retained adjacent said trailing edge, subsequently fixing said document at a first point spaced from the trailing edge approximately in the plane of an aligning surface, using first fixing means, clearing second fixing means for fixing a document on the supply side of the first fixing means, approximately in the plane of the aligning surface, transporting further the trailing edge and a contiguous portion of said document and bending same towards the aligning surface, fixing the document adjacent its trailing edge, using said second fixing means, and clearing said first fixing means spaced from the trailing edge, which stack is supplied to the folding station in a direction transverse to said edges, wherein the documents, after being delivered, are moved relative to each other in an area downstream of said delivery stations and upstream of the folding station, until the document edges on one side of the documents are substantially in alignment, and wherein at least two of the documents to be gathered into a set are delivered, at such times that, before being moved relative to each other downstream of the delivery stations and upstream of the folding station, said at least two documents are transported in a configuration in which said documents overlap each other and each next one of said documents projects relative to the preceding document in the same direction, transverse to the edges to be aligned.

26. A system for assembling a postal item, comprising:

a first and at least one next delivery station for delivering documents;

transporting means for transporting delivered documents;

an aligning and gathering station arranged downstream of the delivery stations, for displacing the documents of a set relative to each other until the document edges located on one side of the stack are substantially aligned, wherein the aligning station includes a supply track, an aligning surface with a displaceable stop and a discharge track in alignment with said aligning surface;

pressing means positioned opposite said aligning surface, which are moveable approximately parallel to the aligning surface, at least in the direction of the stop, for applying pressure to the aligning surface, the pressing means having a greater coefficient of friction relative to the documents than does the aligning surface; and a folding station for folding said stack of documents.

27. A system according to claim 26, wherein the aligning surface is convexly curved in the direction of movement of the stop and the pressing means are designed as an endless belt of which one end extends along the aligning surface.

28. A system for assembling a postal item, comprising:

a first and at least one next delivery station for delivering documents;

transporting means for transporting delivered documents;

means for gathering documents belonging to a given set into a stack having on one side substantially aligned document edges;

an aligning station, arranged downstream of the delivery stations, for displacing the documents in a set relative to each other until the document edges located on one side of the stack are substantially aligned, the aligning station comprising a head station having a supply track, an aligning surface with a displaceable stop and a discharge track in alignment with said aligning surface;

a second supply track located opposite the discharge track and in line with the aligning surface connects to the aligning surface, the stop being displaceable out of the plane of the aligning surface; and a folding station for folding said stack of documents.

29. A system for assembling a postal item, comprising:

a first and at least one next delivery station for delivering documents;

transport means for transporting delivered documents;

an aligning station for gathering and aligning documents belonging to a given set into a stack having on one side substantially aligned document edges, said aligning station being arranged downstream of the delivery station, and a folding station for folding said stack of documents, said folding station being arranged downstream of the aligning station, the aligning station comprising a supply track, an aligning surface connecting to said supply track to receive delivered documents from the supply track, and a discharge track, a detector arranged along the supply track for detecting a trailing edge of a document and means arranged downstream of said detector for the controlled transportation of said document, first and second individually operable fixing means for retaining a document portion resting on the aligning surface, the first fixing means being located downstream of a point where the supply track connects to the aligning surface and the second fixing means being located outside the supply track on a side of the first fixing means that faces the supply track.

30. A system according to claim 29, wherein at least one of the fixing means is designed as a pair of transport rollers arranged opposite each other approximately on opposite sides of the aligning surface.

31. A system according to claim 30, wherein each of the two fixing means is designed as a pair of transport rollers arranged opposite each other approximately on opposite sides of the aligning surface, the rollers of the fixing means being rotatable for discharging documents in intersecting directions.

32. A method for assembling a postal item using a system comprising a first delivery station, at least one next delivery station, a scanner, a gathering and aligning station operatively connected to the scanner and a folding station, comprising:

delivering documents from the delivery stations to a supply track;

individually passing at least some of the delivered documents by a scanner which detects the passage of at least a trailing end of each of said individually passed documents;

supplying the delivered documents along the supply track to the gathering and aligning station;

operating the gathering and aligning station responsive to at least the detected passage of said trailing ends of said individually passed documents, such that each of said trailing ends is brought beyond the supply track to gather the supplied documents and displace the gathered documents relative to each other until the documents form a stack in which document edges transverse to the supply direction are substantially in alignment, and passing the stacked and aligned documents to the folding station and folding the stacked documents in that folding station.

33. A system for assembling a postal item, comprising:

a first and at least one next delivery station for delivering documents of different lengths;

transport means operatively connected to the delivery stations for transporting documents delivered from the delivery stations;

a scanner downstream of the delivery stations and along said transport means for detecting the passage of at least a trailing edge of an individually passing document;

a gathering and aligning station comprising a supply track operatively connected to the transport means, means for displacing supplied documents operatively connected to the scanner for bringing a trailing end of a supplied document beyond the supply track in accordance with the detection of at least a trailing edge of that document by the scanner, said gathering and aligning station being arranged for gathering the supplied documents and displacing the gathered documents relative to each other until a stack with substantially aligned document edges on one side is formed; and, a folding station for folding said stack of documents.

34. A system according to claim 33, wherein the aligning station is designed as a head station having a supply track, an aligning surface with a displaceable stop and a discharge track in alignment with said aligning surface.

35. A system according to claim 34, comprising pressing means opposite said aligning surface, which can be moved approximately parallel to the aligning surface, at least in the direction of the stop, can apply some pressure to the aligning surface and have a greater coefficient of friction relative to documents than does the aligning surface.

36. A system according to claim 34, wherein opposite the discharge track a second supply track connects to the aligning surface and is located in line with the aligning surface, the stop being displaceable out of the plane of the aligning surface.

37. A system according to claim 34, wherein opposite the discharge track a removal station connects to the aligning surface while the stop can be removed from the aligning surface.

38. A system according to claim 34, wherein in the direction of discharge of the stop a pair of folding rollers are arranged, the discharge track extends between the folding rollers and, between the stop and the folding rollers, means are arranged for deflecting the edge of a stack remote from the stop, and opposite at least one of the folding rollers means are arranged for pressing a deflected portion of a stack against a circumferential surface of said folding roller.

39. A system according to claim 33, wherein the aligning station comprises an aligning surface connecting to said supply track and a discharge track, the means for displacing supplied documents comprising means arranged downstream of said scanner for the controlled transportation of individual documents, and first and second individually operable fixing means along the aligning surface for retaining a document portion resting on the aligning surface, the first fixing means being located downstream of a point where the supply track connects to the aligning surface and the second fixing means being located outside the supply track on a side of the first fixing means that faces the supply track.

40. A station for gathering and aligning documents of different lengths, comprising:

a supply track for supplying received documents of mutually different lengths;

a scanner along said supply track for detecting the passage of at least a trailing edge of an individually passing document; and means for displacing supplied documents operatively connected to the supply track and to the scanner for gathering the supplied documents for bringing a trailing end of a supplied document beyond the supply track in accordance with detection of at least a trailing edge of that document by the scanner, and for displacing the gathered documents relative to each other until a stack with substantially aligned documents edges on one side is formed.

41. A method for assembling a postal item using a system comprising a first delivery station, at least one next delivery station, a scanner, and a folding station, in which a plurality of documents are individually delivered by said delivery stations, each delivered document is individually passed by a scanner and scanned downstream of the delivery stations, wherein a length of each document is measured and stored in a memory of a data processor as a code representing the length of said document, which documents are transported and are gathered into a stack having on one side substantially aligned documents edges, the gathering of delivered documents, at least partly, occurs downstream of said delivery stations and upstream of said folding station, which stack is supplied to the folding station in a direction transverse to said edges, wherein the documents, after being delivered, are moved relative to each other in an area downstream of said delivery stations and upstream of the folding station, until the document edges on one side of the documents are substantially in alignment, and wherein depending on said code representing a length associated with a document supplied to an aligning position, said document is displaced substantially counter to the direction of supply, in such a manner that its trailing edge is brought beyond a supply track.

42. A station for gathering and aligning documents of different lengths, comprising:

a supply track for supplying received documents of mutually different lengths;

a detector along said supply track for detecting the passage of a trailing edge of an individually passing document;

an aligning surface connecting to said supply track;

a discharge track connecting to said aligning surface;

means for the controlled transportation of individual documents arranged downstream of the detector along the supply track; and first and second individually operable fixing means adjacent the aligning surface for retaining a document resting on the aligning surface, the first fixing means being located downstream of a point where the supply track connects to the aligning surface and the second fixing means being located outside the supply track on a side of the first fixing means that faces the supply track.

* * * * *